United States Patent Office
3,490,975
Patented Jan. 20, 1970

3,490,975
METHOD OF MAKING AN ARTIFICIAL ARTERY OF WOUND SILICONE RUBBER THREAD
Raymond Lightwood, Smethwick, and Alistair Sutherland, Westwood Heath, Coventry, England, assignors to The University of Birmingham, a British university, and Joseph Lucas (Industries) Limited, both of Birmingham, England
Filed Oct. 10, 1966, Ser. No. 585,608
Claims priority, application Great Britain, Oct. 18, 1965, 44,019
Int. Cl. D04h 3/16; F16l 11/12; A61l 17/00
U.S. Cl. 156—167                                  3 Claims

ABSTRACT OF THE DISCLOSURE

An artificial artery is produced by winding extruded silicone rubber thread onto a mandrel so as to form a porous tube. This tube is then cured, and the cured tube is removed from the mandrel. The diameter of the tube is conveniently determined by rolling the porous tube before curing.

---

This invention relates to artificial arteries.

The invention resides in a method of manufacturing an artificial artery, comprising winding extruded silicone rubber thread onto a mandrel to produce a porous tube, curing the thread, and then removing the tube from the mandrel.

Figure 1:
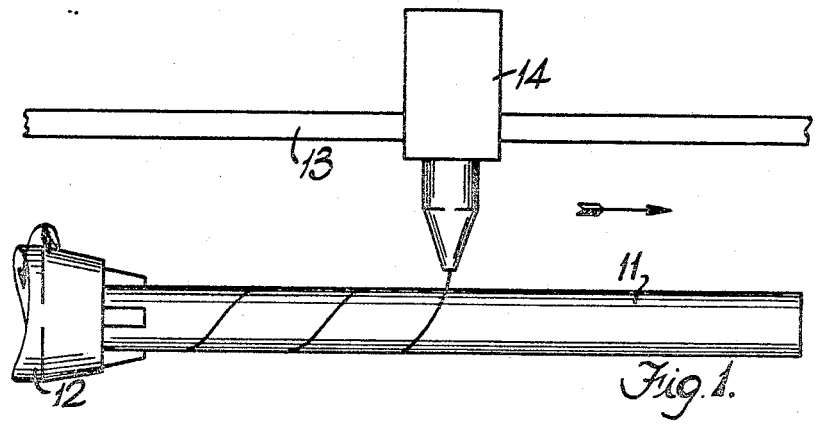
Figure 2:
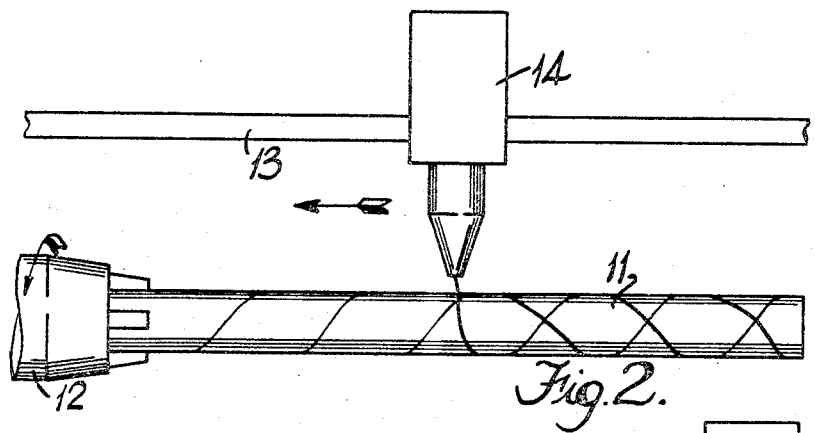
Figure 3:
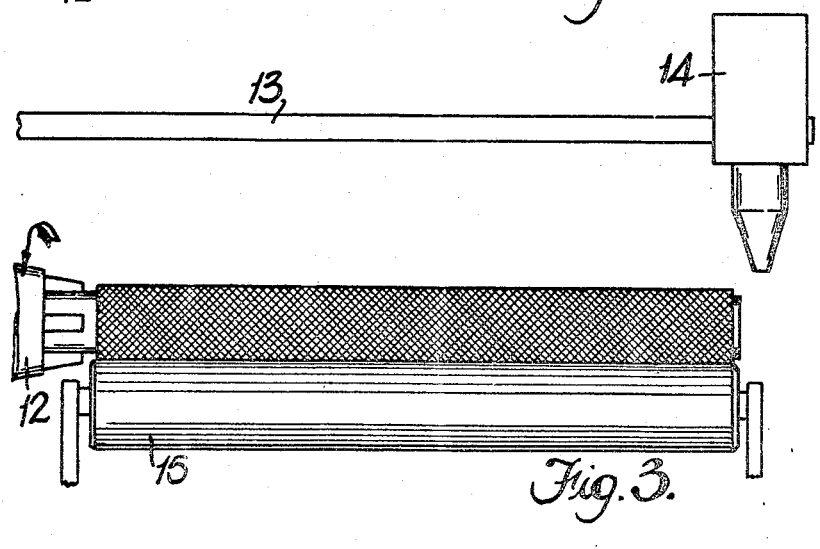

In the accompanying drawings, FIGURES 1 to 3 respectively are side views illustrating three stages during the manufacture of an artery by a method in accordance with one example of the invention.

Referring to the drawing, a mandrel 11 is supported in a rotatable chuck 12. Extending parallel to the mandrel is a rail 13 on which a silicone rubber gun 14 is mounted for sliding movement. The gun 14 can be operated to force silicone rubber through a small aperture so as to produce a thread. It has been found that the thread can be handled in the manner to be described before curing.

In forming the artery, the mandrel 11 is rotated and the gun 14 is moved along the track as shown in FIGURE 1 to wind the thread to helical form. When the gun reaches the end of the mandrel remote from the chuck, its direction at travel is reversed to wind the second layer of thread as shown in FIGURE 2. This procedure is repeated until the required number of layers have been wound. A roller 15 (FIGURE 3) is then caused to act on the wound thread to reduce the diameter thereof so that the artery has the desired texture and porosity. Finally, the mandrel is placed in an oven at 240° C. for twenty minutes to cure the silicone rubber, whereafter the artery is removed from the mandrel.

The rolling operation shown in FIGURE 3 is not vital, but it is preferred because without it close control must be practised during the winding operation to obtain the required texture and porosity.

The characteristics required in the finished product vary considerably, depending on the intended use. In one example which was manufactured without the rolling operation, the completed artery had the following characteristics.

Inside diameter _____ 11.9 mm.
Outside diameter _____ 16.5 mm.
Diameter of thread _____ 180 to 190 microns.
No. of layers _____ 13.
Helix angle _____ 35° to axis.
Porosity _____ 80%.

Having thus described our invention what we claim as new and desire to secure by Letters Patent is:

1. A method of manufacturing an artificial artery, comprising winding extruded silicone rubber thread onto a mandrel to produce a porous tube, curing the thread, and then removing the tube from the mandrel.

2. A method as claimed in claim 1 including the additional step of rolling the porous tube before curing the thread to compact the thread and so modify the texture and porosity of the tube.

3. A method of manufacturing an artificial artery, comprising extruding silicone rubber to form a thread, winding the thread onto a mandrel to produce a porous tube, rolling the porous tube to reduce the diameter thereof, curing the thread, and finally removing the cured tube from the mandrel.

References Cited

UNITED STATES PATENTS 3,317,924  5/1967  Le Veen _____ 128—334 XR
3,340,228  9/1967  Wu.
2,748,805  6/1956  Winstead.

PHILIP DIER, Primary Examiner

U.S. Cl. X.R.

3—1; 128—334; 138—130; 156—175, 196; 264—176